(12) United States Patent
Kita et al.

(10) Patent No.: US 9,312,554 B2
(45) Date of Patent: Apr. 12, 2016

(54) HYDROGEN GENERATOR AND FUEL CELL SYSTEM

(75) Inventors: Hiromi Kita, Nara (JP); Akira Maenishi, Shiga (JP); Masaki Nobuoka, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 249 days.

(21) Appl. No.: 14/119,684

(22) PCT Filed: Apr. 20, 2012

(86) PCT No.: PCT/JP2012/002750
§ 371 (c)(1),
(2), (4) Date: Nov. 22, 2013

(87) PCT Pub. No.: WO2012/164816
PCT Pub. Date: Dec. 6, 2012

(65) Prior Publication Data
US 2014/0093794 A1    Apr. 3, 2014

(30) Foreign Application Priority Data
May 27, 2011    (JP) .................................. 2011-118568

(51) Int. Cl.
*B01J 8/00* (2006.01)
*C01B 3/48* (2006.01)
(Continued)

(52) U.S. Cl.
CPC .............. *H01M 8/0618* (2013.01); *B01J 7/00* (2013.01); *B01J 8/0465* (2013.01); *B01J 8/0469* (2013.01);
(Continued)

(58) Field of Classification Search
CPC .......... B01J 8/0465; C01B 3/384; C01B 3/48; C01B 3/583
See application file for complete search history.

(56) References Cited

U.S. PATENT DOCUMENTS

| 6,413,479 B1 * | 7/2002 | Kudo ..................... B01J 8/0465 208/133 |
| 2002/0090327 A1 * | 7/2002 | Deshpande ............ B01J 8/0465 422/610 |

(Continued)

FOREIGN PATENT DOCUMENTS

| JP | 10-265201 A | 10/1998 |
| JP | 2000-034103 A | 2/2000 |

(Continued)

OTHER PUBLICATIONS

Extended European Search Report issued in European Application No. 12792968.5 dated Oct. 7, 2014.

(Continued)

*Primary Examiner* — Matthew Merkling
(74) *Attorney, Agent, or Firm* — McDermott Will & Emery LLP

(57) ABSTRACT

A hydrogen generator includes: a tubular reformer configured to generate a hydrogen-containing gas by a reforming reaction using a material gas; a CO reducer configured to reduce carbon monoxide contained in the hydrogen-containing gas generated in the reformer; a tubular hydro-desulfurizer provided at an outer periphery of the reformer and configured to remove a sulfur compound contained in the material gas; and a material gas supply passage through which the material gas to be supplied to the hydro-desulfurizer flows. The material gas supply passage is configured to perform heat exchange with the CO reducer, and a material gas inlet port of the hydro-desulfurizer is provided at an end surface closer to the CO reducer.

9 Claims, 8 Drawing Sheets

(51) Int. Cl.
*H01M 8/06* (2006.01)
*B01J 8/04* (2006.01)
*C01B 3/32* (2006.01)
*B01J 7/00* (2006.01)
*C01B 3/38* (2006.01)
*C01B 3/58* (2006.01)

(52) U.S. Cl.
CPC ............. *B01J 8/0496* (2013.01); *C01B 3/32* (2013.01); *C01B 3/384* (2013.01); *C01B 3/48* (2013.01); *C01B 3/583* (2013.01); *H01M 8/0612* (2013.01); *H01M 8/0668* (2013.01); *H01M 8/0675* (2013.01); *B01J 2208/0053* (2013.01); *B01J 2208/00309* (2013.01); *B01J 2208/00495* (2013.01); *B01J 2208/00504* (2013.01); *C01B 2203/0205* (2013.01); *C01B 2203/0233* (2013.01); *C01B 2203/0283* (2013.01); *C01B 2203/044* (2013.01); *C01B 2203/066* (2013.01); *C01B 2203/127* (2013.01); *C01B 2203/82* (2013.01); *Y02E 60/50* (2013.01)

(56) References Cited

U.S. PATENT DOCUMENTS

| | | | | |
|---|---|---|---|---|
| 2004/0047799 | A1* | 3/2004 | Randhava | B01J 8/0465 423/652 |
| 2004/0144029 | A1* | 7/2004 | Miura | B01J 8/0465 48/127.9 |
| 2006/0207179 | A1 | 9/2006 | Mizusawa et al. | |
| 2009/0087705 | A1 | 4/2009 | Fuju et al. | |
| 2009/0317671 | A1* | 12/2009 | Ukai | B01J 8/0465 429/425 |
| 2011/0274991 | A1* | 11/2011 | Azad | B01J 8/0292 429/411 |
| 2012/0114537 | A1* | 5/2012 | Son | B01J 8/0465 422/626 |
| 2012/0237839 | A1 | 9/2012 | Fuju et al. | |
| 2013/0065144 | A1* | 3/2013 | Hashimoto | C01B 3/38 429/425 |
| 2013/0065145 | A1* | 3/2013 | Goto | C01B 3/384 429/425 |
| 2014/0072892 | A1* | 3/2014 | Maenishi | C01B 3/38 429/423 |

FOREIGN PATENT DOCUMENTS

| | | |
|---|---|---|
| JP | 2000-159501 A | 6/2000 |
| JP | 2003-160306 A | 6/2003 |
| JP | 2004-288434 A | 10/2004 |
| JP | 2007-015911 A | 1/2007 |
| JP | 2009-078954 A | 4/2009 |
| JP | 2010-058995 A | 3/2010 |
| JP | 2010-100494 A | 5/2010 |

OTHER PUBLICATIONS

International Search Report issued in PCT/JP2012/002750, dated Jul. 3, 2012.

* cited by examiner

HYDROGEN GENERATOR AND FUEL CELL SYSTEM

RELATED APPLICATIONS

This application is the U.S. National Phase under 35 U.S.C. §371 of International Application No. PCT/JP2012/002750, filed on Apr. 20, 2012, which in turn claims the benefit of Japanese Application No. 2011-118568, filed on May 27, 2011, the disclosures of which Applications are incorporated by reference herein.

TECHNICAL FIELD

The present invention relates to a hydrogen generator and a fuel cell system.

BACKGROUND ART

An infrastructure for supplying a hydrogen-containing gas used as a fuel at the time of power generation is not developed as a typical material infrastructure, so that a fuel cell system typically includes a hydrogen generator including a reformer configured to generate a hydrogen-containing gas from a natural gas or LPG supplied from the typical material infrastructure.

In the reformer, a steam-reforming reaction is typically used. In the steam-reforming reaction, for example, a city gas and steam that are materials are caused to react with each other at a high temperature of about 600 to 700° C. by using a precious metal-based reforming catalyst, such as a Ni-based reforming catalyst or a Ru-based reforming catalyst. Thus, the hydrogen-containing gas containing hydrogen as a major component is generated.

A material gas, such as the city gas, contains a sulfur compound. Since the sulfur compound is a poisoning material especially for the reforming catalyst, it has to be removed in some way. Here, proposed is a hydrogen generator adopting as one removing method a method of removing the sulfur compound by hydrodesulfurization using a recycled hydrogen-containing gas (see PTL 1, for example).

FIG. 8 is a cross-sectional view showing a schematic configuration of a hydrogen generator of PTL 1. In this configuration, a raw fuel is supplied through a lower end surface of a hydro-desulfurizer 3. The raw fuel having been desulfurized in the hydro-desulfurizer 3 is discharged through an upper end surface of the hydro-desulfurizer 3 to be supplied through a complexly curved passage to a reformer 2. The hydrogen-containing gas discharged from the reformer 2 flows through a shift converter 5 and a selective oxidizer 6 to be discharged to the outside of the hydrogen generator.

CITATION LIST

Patent Literature

PTL 1: Japanese Laid-Open Patent Application Publication No. 2010-058995

SUMMARY OF INVENTION

Technical Problem

The hydrogen generator disclosed in PTL 1 has a problem that the use efficiency of a hydrogenation catalyst is inadequate.

The present invention was made to solve the above problem, and an object of the present invention is to increase the use efficiency of a hydrogenation catalyst more than before in a hydrogen generator including a hydro-desulfurizer and in a fuel cell system including a hydro-desulfurizer.

Solution to Problem

To solve the above problem, one aspect of a hydrogen generator of the present invention includes: a tubular reformer configured to generate a hydrogen-containing gas by a reforming reaction using a material gas; a CO reducer configured to reduce carbon monoxide contained in the hydrogen-containing gas generated in the reformer; a tubular hydro-desulfurizer provided at an outer periphery of the reformer and configured to remove a sulfur compound contained in the material gas; and a material gas supply passage through which the material gas to be supplied to the hydro-desulfurizer flows, wherein: the material gas supply passage is configured to perform heat exchange with the CO reducer; and a material gas inlet port of the hydro-desulfurizer is provided at an end surface closer to the CO reducer.

A fuel cell system of the present invention includes the hydrogen generator and a fuel cell configured to generate electric power using the hydrogen-containing gas supplied from the hydrogen generator.

Advantageous Effects of Invention

One aspect of the present invention provides a hydrogen generator and a fuel cell system, each of which improves the use efficiency of the hydrogenation catalyst more than before.

DESCRIPTION OF EMBODIMENTS

Figure 1:
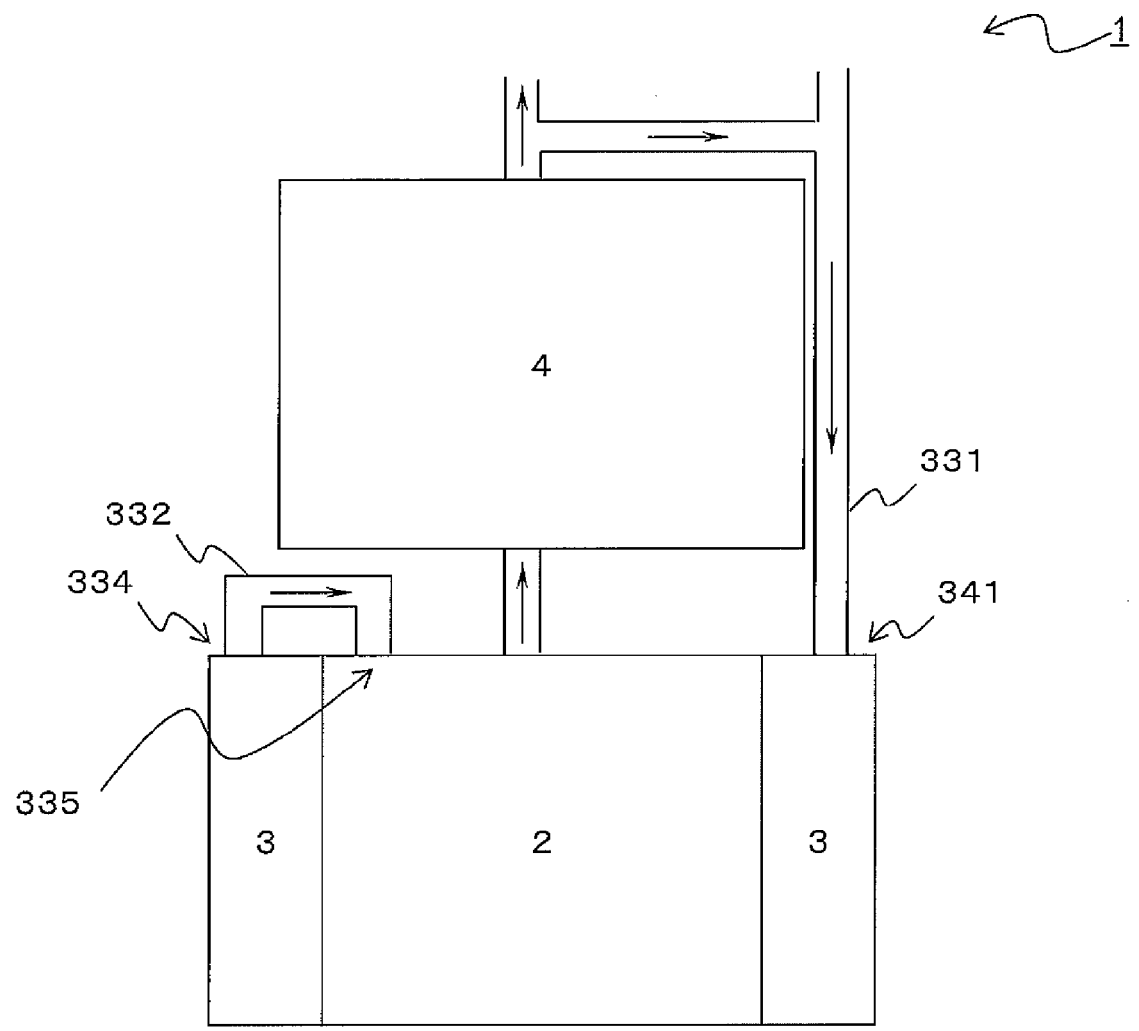
FIG. 1 is a conceptual diagram showing one example of a schematic configuration of a hydrogen generator according to Embodiment 1.

The present inventors have found that the use efficiency of a hydrogenation catalyst is inadequate in a hydrogen generator including a hydro-desulfurizer, and have diligently studied the cause. As a result, the present inventors have obtained the following findings.

The hydro-desulfurizer operates at comparatively high temperatures (for example, 200 to 300° C.), but a conventional hydrogen generator is configured such that a raw fuel at ordinary temperatures directly flows into the hydro-desulfurizer. Therefore, the temperature of the catalyst at an inlet port side of the hydro-desulfurizer is below an appropriate temperature range, so that the catalyst at the inlet port side is unlikely to be efficiently utilized.

A material gas supply passage is configured to be able to perform heat exchange with a CO reducer, and a material gas inlet port of the hydro-desulfurizer is provided at an end surface closer to the CO reducer. With this, as compared to a case where the material is not heated before the material flows into the hydro-desulfurizer, a possibility that the temperature of the catalyst at the inlet port side of the hydro-desulfurizer is below the appropriate temperature range is reduced, and the use efficiency of the catalyst at the inlet port side improves.

Embodiment 1

A hydrogen generator according to Embodiment 1 includes: a tubular reformer configured to generate a hydrogen-containing gas by a reforming reaction using a material gas; a CO reducer configured to reduce carbon monoxide contained in the hydrogen-containing gas generated in the reformer; a tubular hydro-desulfurizer provided at an outer periphery of the reformer and configured to remove a sulfur compound contained in the material gas; and a material gas supply passage through which the material gas to be supplied to the hydro-desulfurizer flows, wherein: the material gas supply passage is configured to perform heat exchange with the CO reducer; and a material gas inlet port of the hydro-desulfurizer is provided at an end surface closer to the CO reducer.

According to this configuration, as compared to a case where the material is not heated before the material flows into the hydro-desulfurizer, a possibility that the temperature of the catalyst at the inlet port side of the hydro-desulfurizer is below the appropriate temperature range is reduced, and the use efficiency of the catalyst at the inlet port side improves. As compared to a case where the material gas inlet port of the hydro-desulfurizer is provided at the end surface farther from the CO reducer, the length of the passage from the portion where the heat exchange with the CO reducer is performed to the portion where the material gas flows into the hydro-desulfurizer is reduced. Therefore, the heat release of the material gas is suppressed, and the use efficiency is further improved. In addition, the heat of the CO reducer is utilized to heat the material. Therefore, as compared to a case where the material is heated by the heater, the energy efficiency improves.

Here, the expression "tubular hydro-desulfurizer provided at an outer periphery of the reformer" denotes that the tubular hydro-desulfurizer is provided so as to cover at least a part of the outer periphery of the reformer.

The hydrogen generator may be configured such that: a material gas inlet port of the reformer is provided at an end surface closer to the CO reducer out of two end surfaces of the tubular reformer; and a material gas outlet port of the hydro-desulfurizer is provided at an end surface closer to the CO reducer out of two end surfaces of the tubular hydro-desulfurizer.

According to this configuration, as compared to a case where the material gas outlet port of the hydro-desulfurizer is provided at an end surface farther from the CO reducer out of two end surfaces of the tubular hydro-desulfurizer, the heat release can be suppressed by the shortening of the length of the passage to the material gas inlet port of the reformer. Thus, the energy efficiency improves.

The hydrogen generator may be configured such that at least a part of the end surface at which the material gas inlet port of the hydro-desulfurizer is provided includes a portion not overlapping the CO reducer when viewed from an axis direction of the hydro-desulfurizer.

According to this configuration, the material gas inlet port can be provided at the portion not overlapping the CO reducer. In a case where the material gas inlet port is provided at the portion not overlapping the CO reducer, the number of portions that require a work (such as bending) for bypassing the CO reducer is reduced, and the manufacture is simplified.

The hydrogen generator may be configured such that the material gas inlet port of the hydro-desulfurizer is provided at the portion not overlapping the CO reducer.

According to this configuration, the material gas supply passage extending to the hydro-desulfurizer can be provided at the portion not overlapping the CO reducer. Thus, the number of portions that require a work (such as bending) for bypassing the CO reducer is reduced, and the manufacture is simplified.

The hydrogen generator may be configured such that the material gas outlet port of the hydro-desulfurizer is provided at the portion not overlapping the CO reducer.

According to this configuration, the material gas discharge passage extending from the hydro-desulfurizer can be provided at the portion not overlapping the CO reducer. Thus, the number of portions that require a work (such as bending) for bypassing the CO reducer is reduced, and the manufacture is simplified.

The hydrogen generator may be configured such that: the CO reducer has a tubular shape; and an outer diameter of the hydro-desulfurizer is larger than that of the CO reducer.

According to this configuration, at least a part of the end surface at which at least one of the material gas inlet port and outlet port of the hydro-desulfurizer is provided can be configured to include the portion not overlapping the CO reducer.

The hydrogen generator may be configured such that: the hydro-desulfurizer is provided under the CO reducer in a vertical direction; the hydro-desulfurizer includes therein a hydrodesulfurization catalyst and a passage penetrating the hydrodesulfurization catalyst, the passage including a lower end having an opening that is open in the hydro-desulfurizer; and an upper end of the passage is connected to any one of the material gas inlet port of the hydro-desulfurizer and the material gas outlet port of the hydro-desulfurizer.

According to this configuration, even in a case where the hydrodesulfurization catalyst becomes powder to fall in the hydro-desulfurizer, the passage is unlikely to clog.

Device Configuration

FIG. 1 is a conceptual diagram showing one example of a schematic configuration of a hydrogen generator according to Embodiment 1.

In the example shown in FIG. 1, a hydrogen generator 1 of the present embodiment includes: a reformer 2, a hydro-desulfurizer 3, a CO reducer 4, a material gas supply passage 331, and a material gas discharge passage 332.

The reformer 2 has a tubular shape and generates a hydrogen-containing gas by a reforming reaction using a material gas. The material contains an organic compound containing at least carbon and hydrogen as constituent elements. Specifically, examples of the material include hydrocarbons, such as a natural gas, a city gas, a LPG, and a LNG, and alcohols, such as methanol and ethanol. The city gas is a gas supplied from a gas company through pipes to respective houses and the like. The reforming reaction may be any reforming reaction, and examples of the reforming reaction include a steam-reforming reaction, an autothermal reaction, and a partial oxidation reaction. The hydrogen-containing gas generated in the reformer 2 is supplied through a hydrogen supply passage to a hydrogen utilizing device, not shown. An outer shell of the reformer 2 may be made of metal, such as stainless steel.

The hydro-desulfurizer 3 is provided at an outer periphery of the reformer, has a tubular shape, and removes a sulfur compound contained in the material gas by a hydrogenation reaction. The hydro-desulfurizer 3 is configured such that a hydrodesulfurization catalyst is filled in a tubular container. The hydrodesulfurization catalyst is constituted by, for example, a CoMo-based catalyst that converts the sulfur compound contained in the material gas into hydrogen sulfide and at least one of a ZnO-based catalyst and a CuZn-based catalyst, each of which is an adsorbent that adsorbs the obtained hydrogen sulfide. The hydrodesulfurization catalyst is not limited to this example and may be constituted only by the CuZn-based catalyst. An outer shell of the hydro-desulfurizer 3 may be made of metal, such as stainless steel.

The CO reducer 4 reduces carbon monoxide contained in the hydrogen-containing gas generated in the reformer 2. The CO reducer 4 is constituted by, for example, at least one of a shift converter configured to reduce carbon monoxide contained in the hydrogen-containing gas by a shift reaction and a selective oxidizer configured to reduce the carbon monoxide contained in the hydrogen-containing gas by a selective oxidation reaction. An outer shell of the CO reducer 4 may be made of metal, such as stainless steel.

The material gas supply passage 331 is a passage through which the material gas to be supplied to the hydro-desulfurizer 3 flows and is configured to be able to perform heat exchange with the CO reducer 4. The material gas supply passage 331 is connected to a material gas inlet port 341 of the hydro-desulfurizer 3. The material gas supply passage 331 may be configured to be able to perform heat exchange with the CO reducer 4 by arranging the material gas supply passage 331 in the vicinity of the CO reducer 4, by causing the material gas supply passage 331 to contact the CO reducer 4, or by causing the material gas supply passage 331 to be opposed to the CO reducer 4 via a certain member. The material gas supply passage 331 may be made of metal, such as stainless steel.

The material gas inlet port 341 of the hydro-desulfurizer 3 is provided at an end surface closer to the CO reducer 4 out of two end surfaces of the hydro-desulfurizer 3 having a tubular shape.

The material gas discharge passage 332 is a passage through which the material gas discharged from the hydro-desulfurizer 3 flows. One end of the material gas discharge passage 332 is connected to a material gas outlet port 334 provided at one end surface, such as an upper end surface, of the hydro-desulfurizer 3, and the other end thereof is connected to a material gas inlet port 335 provided at one end surface, such as an upper end surface, of the reformer 2, the end surface being located on the same side as the above end surface of the hydro-desulfurizer 3.

The hydrogen-containing gas discharged from the CO reducer 4 is added to the material gas supply passage 331.

The material gas inlet port 335 of the reformer 2 is provided at the end surface closer to the CO reducer 4 out of two end surfaces of the reformer 2 having a tubular shape, and the material gas outlet port 334 of the hydro-desulfurizer 3 is provided at the end surface closer to the CO reducer 4 out of two end surfaces of the hydro-desulfurizer 3 having a tubular shape.

At least a part of the end surface at which the material gas inlet port 341 of the hydro-desulfurizer 3 is provided includes a portion not overlapping the CO reducer 4 when viewed from an axis direction of the hydro-desulfurizer 3. In the example of FIG. 1, the material gas inlet port 341 of the hydro-desulfurizer 3 is provided at the portion not overlapping the CO reducer 4. With this, as shown in FIG. 1, the material gas supply passage 331 extending in the vicinity of the CO reducer 4 can linearly extend without forming bent portions to be connected to the hydro-desulfurizer 3.

The material gas outlet port 334 of the hydro-desulfurizer 3 may be provided at a portion of the end surface at which the material gas inlet port 341 of the hydro-desulfurizer 3 is provided, the portion not overlapping the CO reducer 4 when viewed from the axis direction of the hydro-desulfurizer 3.

The configuration of the portion not overlapping the CO reducer 4 when viewed from the axis direction of the hydro-desulfurizer 3 is not limited to the example of FIG. 1 and is arbitrary. For example, the entire end surface at which the material gas inlet port 341 of the hydro-desulfurizer 3 is provided may be the portion not overlapping the CO reducer 4. Unlike the example of FIG. 1, the portion not overlapping the CO reducer 4 does not have to exist over the entire periphery of the end surface of the hydro-desulfurizer 3. For example, the hydro-desulfurizer 3 may be configured to include a portion not overlapping the CO reducer 4 only at a part of the end surface in a circumferential direction.

The CO reducer 4 has a tubular shape, and an outer diameter of the hydro-desulfurizer 3 is larger than that of the CO reducer 4.

An outlet port of the CO reducer 4 is connected to a hydrogen-containing gas passage. The hydrogen-containing gas passage branches, and one of branched passages communicates with the material gas supply passage 331, and the other is connected to a hydrogen-containing gas exhaust port. The hydrogen-containing gas exhaust port is connected to a hydrogen utilizing device, not shown. The hydrogen-containing gas passage may communicate with the material gas supply passage 331 in the vicinity of the CO reducer 4. With this, the hydrogen-containing gas can be supplied to the material gas supply passage 331 without cooling the hydrogen-containing gas.

Operations

Hereinafter, operations of the hydrogen generator 1 will be explained.

The material gas is supplied to the material gas supply passage 331 from a material gas supply source, not shown. A part of the hydrogen-containing gas discharged from the CO reducer 4 is added as hydrogen to the material gas flowing through the material gas supply passage 331. The material gas to which the hydrogen has been added flows through the material gas inlet port 341 to be supplied to the inside of the hydro-desulfurizer 3. In the hydro-desulfurizer 3, the sulfur compound contained in the material gas is removed. After that, the desulfurized material gas is supplied through the material gas outlet port 334 and the material gas discharge passage 332 to the reformer 2.

In the reformer 2, the hydrogen-containing gas is generated by the reforming reaction using the desulfurized material gas. The obtained hydrogen-containing gas is supplied from the reformer 2 to the CO reducer 4. In the CO reducer 4, the concentration of the carbon monoxide contained in the hydrogen-containing gas is reduced. A part of the hydrogen-containing gas, which has been discharged from the CO reducer 4 and whose carbon monoxide concentration has been reduced, is supplied to the material gas supply passage 331, and the rest of the hydrogen-containing gas is supplied to the hydrogen utilizing device, not shown.

Embodiment 2

The hydrogen generator of Embodiment 2 is configured such that: in the hydrogen generator of Embodiment 1, the hydro-desulfurizer is provided under the CO reducer in a vertical direction; the hydro-desulfurizer includes therein a hydrodesulfurization catalyst and a passage penetrating the hydrodesulfurization catalyst, the passage including a lower end having an opening that is open in the hydro-desulfurizer; and an upper end of the passage is connected to any one of the material gas inlet port of the hydro-desulfurizer and the material gas outlet port of the hydro-desulfurizer.

According to this configuration, the passage is unlikely to clog even in a case where the hydrodesulfurization catalyst becomes powder to fall inside the hydro-desulfurizer.

Other than the above feature, the hydrogen generator of the present embodiment may be configured to be the same as the hydrogen generator of Embodiment 1.

Figure 2:
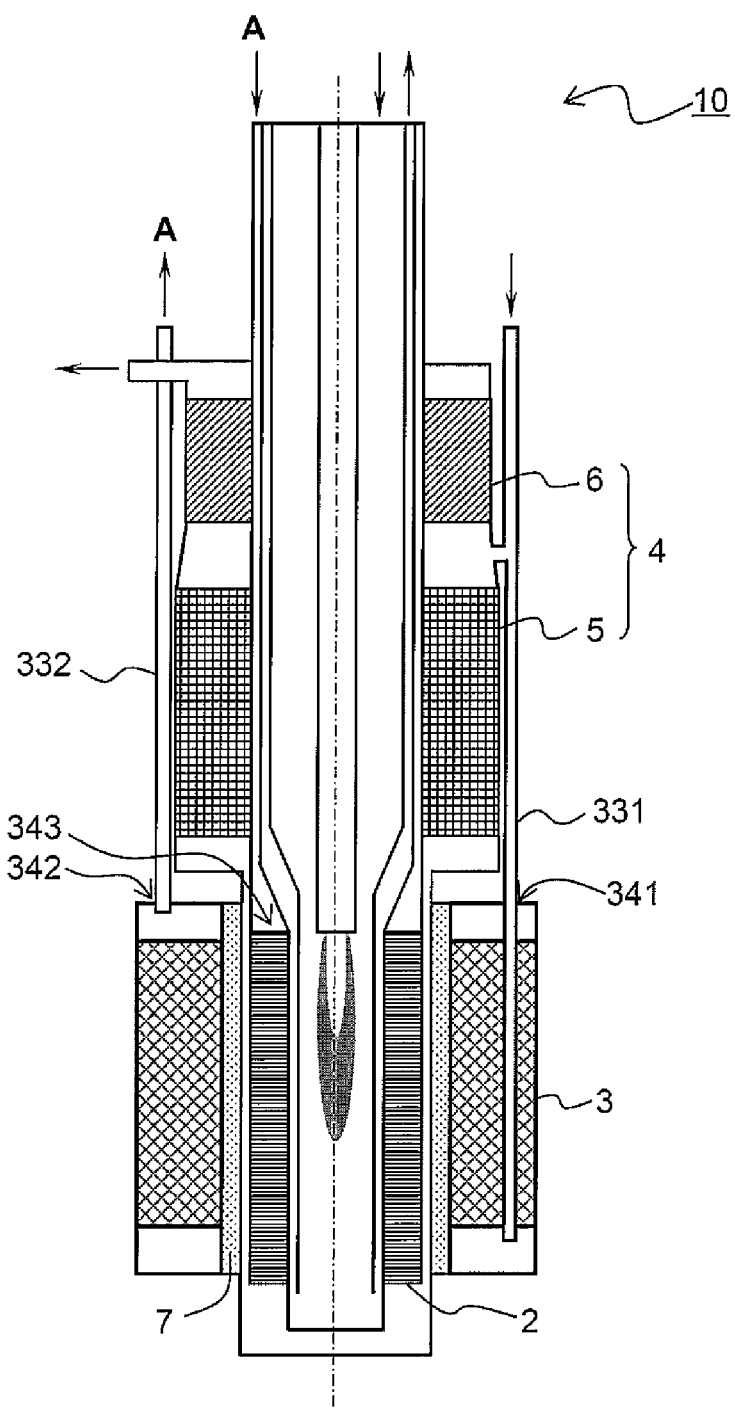
FIG. 2 is a cross-sectional view showing one example of a schematic configuration of the hydrogen generator according to Embodiment 2.

FIG. 2 is a cross-sectional view showing one example of a schematic configuration of the hydrogen generator according to Embodiment 2.

In the example shown in FIG. 2, a hydrogen generator 10 of the present embodiment includes the reformer 2, the hydro-desulfurizer 3, the CO reducer 4, the material gas supply passage 331, and the material gas discharge passage 332.

Since the reformer 2 and the hydro-desulfurizer 3 herein are the same as those in Embodiment 1, explanations thereof are omitted.

The CO reducer 4 includes a shift converter 5 provided downstream of the reformer 2 and a selective oxidizer 6 provided downstream of the shift converter 5. The shift converter 5 reduces the carbon monoxide contained in the hydrogen-containing gas by the shift reaction. The selective oxidizer 6 reduces the carbon monoxide contained in the hydrogen-containing gas by the selective oxidation reaction.

The hydro-desulfurizer 3 is provided under the CO reducer 4 in a vertical direction. In the example of FIG. 2, the material gas supply passage 331 penetrates the hydrodesulfurization catalyst in the hydro-desulfurizer 3, and a lower end thereof has an opening that is open in the hydro-desulfurizer 3. An upper end of the material gas supply passage 331 in the hydro-desulfurizer 3 is connected to the material gas inlet port 341 of the hydro-desulfurizer 3.

According to the operations of the hydrogen generator of the present embodiment, the hydrogen-containing gas is supplied to the material gas supply passage 331 through a passage in the CO reducer 4, that is, a passage branching from between the shift converter 5 and the selective oxidizer 6. Except for the above, the operations of the hydrogen generator of the present embodiment are the same as those of Embodiment 1, so that detailed explanations thereof are omitted.

Configuration of Hydro-Desulfurizer

Figure 3:
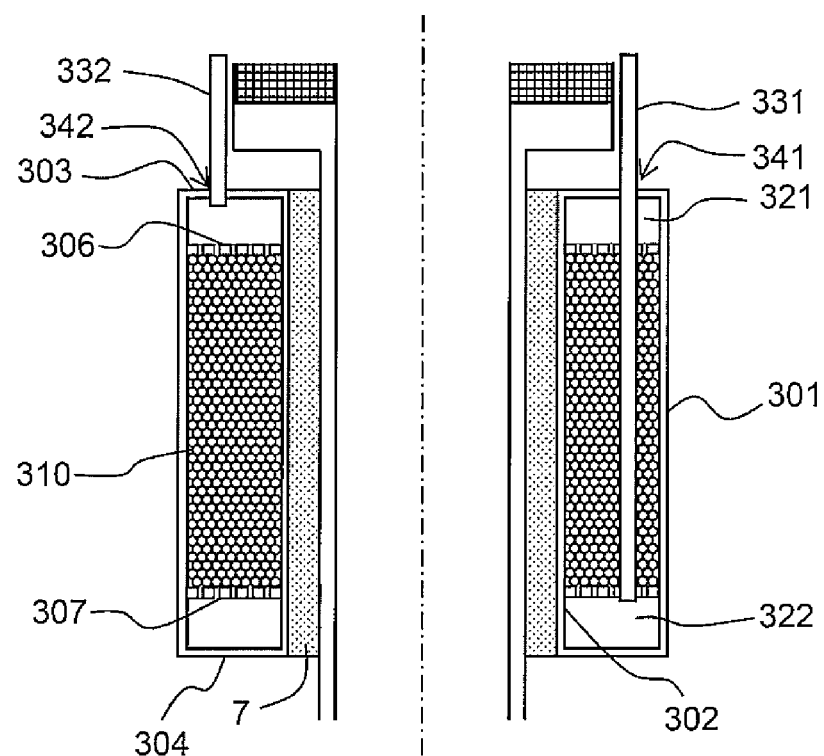
FIG. 3 is a cross-sectional view showing one example of a schematic configuration of a hydro-desulfurizer according to Embodiment 2.

FIG. 3 is a cross-sectional view showing one example of a schematic configuration of the hydro-desulfurizer according to Embodiment 2. Hereinafter, the configuration of the hydro-desulfurizer according to the present embodiment will be explained in detail in reference to FIG. 3.

An outer shell of the hydro-desulfurizer 3 is constituted by an outer tube 301, an inner tube 302 that is smaller in radius than the outer tube 301, a doughnut-shaped upper surface plate 303, and a doughnut-shaped lower surface plate 304. When viewed from a main axis direction of the hydro-desulfurizer 3, the outer tube 301 and the inner tube 302 are concentric with each other. A heat insulating member 7 is provided between the inner tube 302 and the reformer 2. The term "doughnut-shaped" herein denotes a plate shape having a circular outer periphery and a circular hole that is located at a center, concentric with the outer periphery, and smaller in radius than the outer periphery (the same shall apply hereinafter).

A doughnut-shaped dividing member 306 having a flat surface parallel to the upper surface plate 303 is provided under the upper surface plate 303, and a doughnut-shaped dividing member 307 having a flat surface parallel to the lower surface plate 304 is provided above the lower surface plate 304 so as to fill a space between the outer tube 301 and the inner tube 302. A space defined by the outer tube 301, the inner tube 302, the dividing member 306, and the dividing member 307 is filled with a bead-like hydrodesulfurization catalyst 310. A space defined by the outer tube 301, the inner tube 302, the dividing member 306, and the upper surface plate 303, in other words, a space above the dividing member 306 in the hydro-desulfurizer 3 constitutes an upper header 321. A space defined by the outer tube 301, the inner tube 302, the dividing member 307, and the lower surface plate 304, that is, a space under the dividing member 307 in the hydro-desulfurizer 3 constitutes a lower header 322.

A larger number of openings that are smaller than the beads of the hydrodesulfurization catalyst 310 are formed on each of the dividing member 306 and the dividing member 307. The material gas supply passage 331 is introduced to the upper header 321 through the material gas inlet port 341. Further, the material gas supply passage 331 penetrates the dividing member 306, the hydrodesulfurization catalyst 310, and the dividing member 307 to reach the lower header 322. A lower end portion of the material gas supply passage 331 includes an opening portion that is open downward in the lower header 322. The material gas discharge passage 332 is introduced to the upper header 321 through a material gas outlet port 342 and includes an opening portion that is open downward in the upper header 321.

According to this configuration, the material gas flowing through the material gas supply passage 331 is discharged through the opening of the lower end of the material gas supply passage 331 to the lower header 322 to be supplied through the dividing member 307 to the hydrodesulfurization catalyst 310. The material gas which has flowed through the hydrodesulfurization catalyst 310 and from which the sulfur compound has been removed is discharged through the dividing member 306 to the upper header 321. Further, the material gas is introduced through the material gas discharge passage 332 to the outside of the hydro-desulfurizer 3.

The opening portion of the material gas supply passage 331 is open downward in the lower header 322. Therefore, even in a case where the hydrodesulfurization catalyst 310 becomes powder to fall through the openings of the dividing member 307, the falling powder of the hydrodesulfurization catalyst 310 is unlikely to get into the material gas supply passage 331. Therefore, the clogging of the material gas supply passage 331 is suppressed.

Shapes of CO Reducer and Hydro-Desulfurizer when Viewed in Axis Direction

Figure 4:
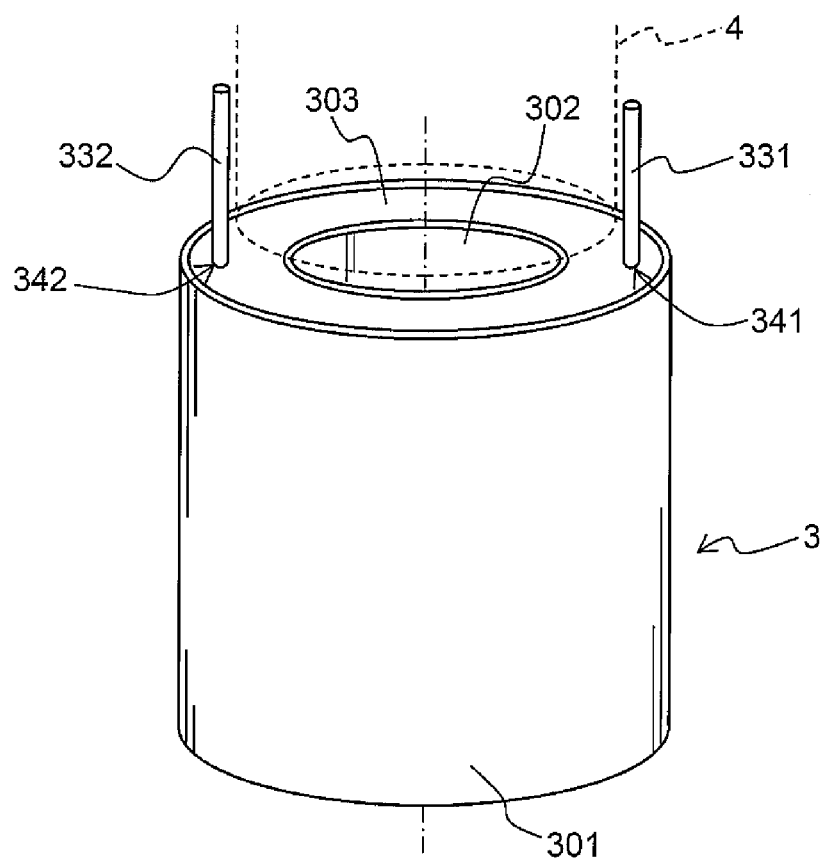
FIG. 4 is a perspective view showing one example of a schematic configuration of the hydro-desulfurizer according to Embodiment 2.

FIG. 4 is a perspective view showing one example of a schematic configuration of a hydro-desulfurizer in Embodiment 2. Hereinafter, the shapes of the CO reducer and the hydro-desulfurizer in the hydro-desulfurizer of the present embodiment when viewed from the axis direction will be explained in reference to FIG. 4.

At least a part of the end surface at which the material gas inlet port 341 of the hydro-desulfurizer 3 is provided includes a portion not overlapping the CO reducer 4 when viewed from the axis direction of the hydro-desulfurizer 3. The CO reducer 4 has a tubular shape, and the outer diameter of the hydro-desulfurizer 3 is larger than that of the CO reducer 4. When viewed from the main axis direction, the outer periphery of the hydro-desulfurizer 3 and the outer periphery of the CO reducer 4 are concentric with each other, and the diameter of a circle formed by the outer periphery of the hydro-desulfurizer 3 is larger than that of a circle formed by the outer periphery of the CO reducer 4. A portion defined by the outer periphery of the CO reducer 4 and the outer periphery of the hydro-desulfurizer 3 when viewed from above corresponds to the portion not overlapping the CO reducer 4. The material gas inlet port 341 of the hydro-desulfurizer 3 and the material gas outlet port 342 of the hydro-desulfurizer 3 are provided at the portion not overlapping the CO reducer 4, so as to sandwich the axis of the hydro-desulfurizer 3 and be opposed to each other. The configuration of the portion not overlapping the CO reducer 4 when viewed from the axis direction of the hydro-desulfurizer 3 is not limited to the example shown in FIG. 4 and is arbitrary as with Embodiment 1.

The material gas supply passage 331 linearly extends from the portion of the end surface of the hydro-desulfurizer 3, the portion not overlapping the CO reducer 4 when viewed from the axis direction of the hydro-desulfurizer 3. Then, the material gas supply passage 331 passes through the vicinity of the CO reducer 4. Therefore, the material gas supply passage 331 does not have to bypass the CO reducer 4 and can perform heat exchange with the CO reducer 4. Similarly, the material gas discharge passage 332 linearly extends from the portion not overlapping the CO reducer 4 and passes through the vicinity of the CO reducer 4. Therefore, the material gas discharge passage 332 does not have to bypass the CO reducer 4. With this, the configurations of the material passages can be simplified. Since it becomes unnecessary to arrange pipes, such as the material passages, on an outer wall surface of the hydro-desulfurizer 3, a simple cylindrical surface can be realized. Therefore, a heater for temperature increase is easily attached to the hydro-desulfurizer 3, and the adhesion between the hydro-desulfurizer 3 and the heat insulating member improves, so that the heat insulation property improves.

Modification Example 1

Figure 5:
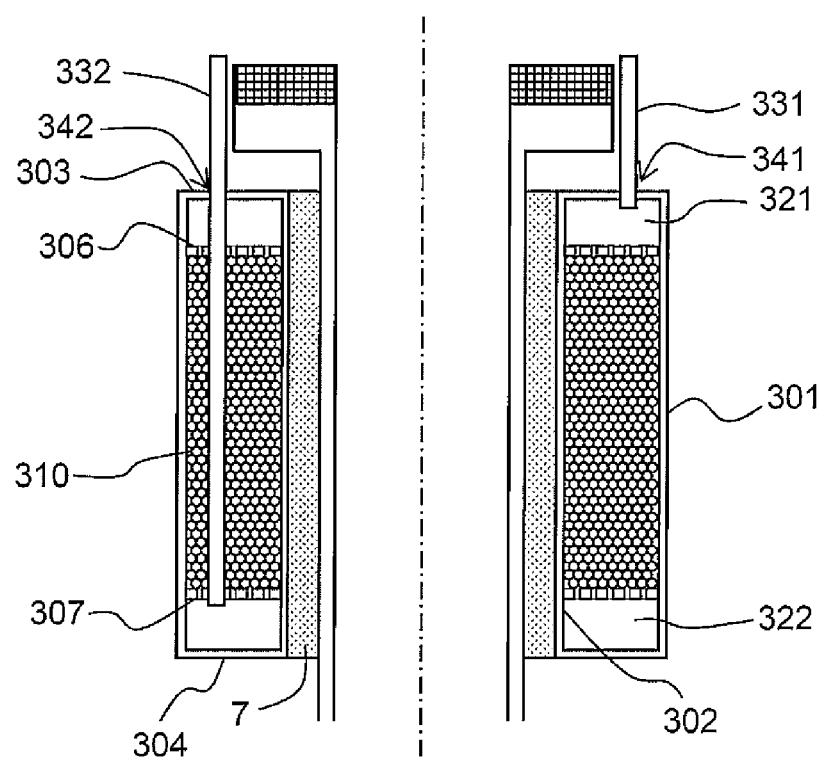
FIG. 5 is a cross-sectional view showing one example of a schematic configuration of the hydro-desulfurizer according to Modification Example 1 of Embodiment 2.

FIG. 5 is a cross-sectional view showing one example of a schematic configuration of the hydro-desulfurizer according to Modification Example 1 of Embodiment 2.

As shown in FIG. 5, in the present modification example, the material gas supply passage 331 is introduced to the upper header 321 through the material gas inlet port 341 and includes an opening portion that is open downward in the upper header 321. The material gas discharge passage 332 is introduced to the upper header 321 through the material gas outlet port 342. Further, the material gas discharge passage 332 penetrates the dividing member 306, the hydrodesulfurization catalyst 310, and the dividing member 307 to reach the lower header 322. A lower end portion of the material gas discharge passage 332 includes an opening portion that is open downward in the lower header 322.

According to this configuration, the material gas flowing through the material gas supply passage 331 is discharged through the opening of the lower end of the material gas supply passage 331 to the upper header 321 to be supplied through the dividing member 306 to the hydrodesulfurization catalyst 310. The material gas which has flowed through the hydrodesulfurization catalyst 310 and from which the sulfur compound has been removed is discharged through the dividing member 307 to the lower header 322. Further, the material gas is introduced through the material gas discharge passage 332 to the outside of the hydro-desulfurizer 3.

Except for the above, the hydrogen generator of the present modification example is the same as that of Embodiment 1.

The opening portion of the material gas discharge passage 332 is open downward in the lower header 322. Therefore, even in a case where the hydrodesulfurization catalyst 310 becomes powder to fall through the openings of the dividing member 307, the falling powder of the hydrodesulfurization catalyst 310 is unlikely to get into the material gas discharge passage 332. Therefore, the clogging of the material gas discharge passage 332 is suppressed.

Modification Example 2

Figure 6:
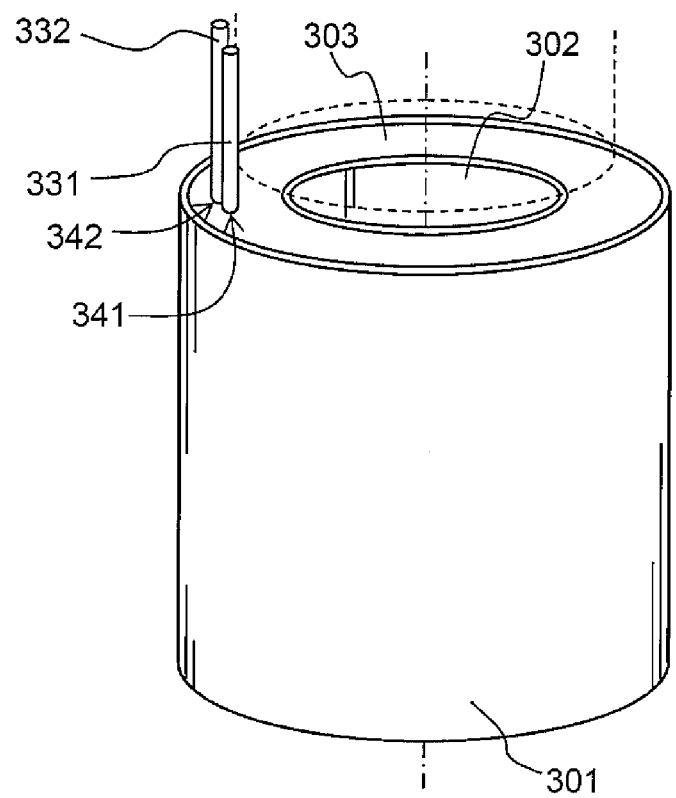
FIG. 6 is a perspective view showing one example of a schematic configuration of the hydro-desulfurizer according to Modification Example 2 of Embodiment 2.

FIG. 6 is a perspective view showing one example of a schematic configuration of the hydro-desulfurizer according to Modification Example 2 of Embodiment 2. Hereinafter, the shapes of the CO reducer and the hydro-desulfurizer when viewed from the axis direction in the present modification example will be explained in reference to FIG. 6.

At least a part of the end surface at which the material gas inlet port 341 of the hydro-desulfurizer 3 is provided includes a portion not overlapping the CO reducer 4 when viewed from the axis direction of the hydro-desulfurizer 3. The CO reducer 4 has a tubular shape, and the outer diameter of the hydro-desulfurizer 3 is larger than that of the CO reducer 4. When viewed from the main axis direction, the outer periphery of the hydro-desulfurizer 3 and the outer periphery of the CO reducer 4 are concentric with each other, and the diameter of a circle formed by the outer periphery of the hydro-desulfurizer 3 is larger than that of a circle formed by the outer periphery of the CO reducer 4. A portion defined by the outer periphery of the CO reducer 4 and the outer periphery of the hydro-desulfurizer 3 when viewed from above corresponds to the portion not overlapping the CO reducer 4. The material gas inlet port 341 of the hydro-desulfurizer 3 and the material gas outlet port 342 of the hydro-desulfurizer 3 are provided at the portion not overlapping the CO reducer 4, so as to be adjacent to each other. The configuration of the portion not overlapping the CO reducer 4 when viewed from the axis direction of the hydro-desulfurizer 3 is not limited to the example shown in FIG. 6 and is arbitrary as with Embodiment 1.

According to this configuration, since the material gas supply passage 331 and the material gas discharge passage 332 are arranged so as to be adjacent to each other, the heat exchange is performed between the material gas supply passage 331 and the material gas discharge passage 332, and the material gas supply passage 331 is heated by the material gas discharge passage 332. Therefore, the use efficiency and heat efficiency of the hydrodesulfurization catalyst 310 further improve.

Embodiment 3

A fuel cell system according to Embodiment 3 includes the hydrogen generator according to any one of Embodiments 1 and 2 and their modification examples and a fuel cell configured to generate electric power using the hydrogen-containing gas supplied from the hydrogen generator.

According to this configuration, the use efficiency of the hydrogenation catalyst can be improved more than before.

Figure 7:
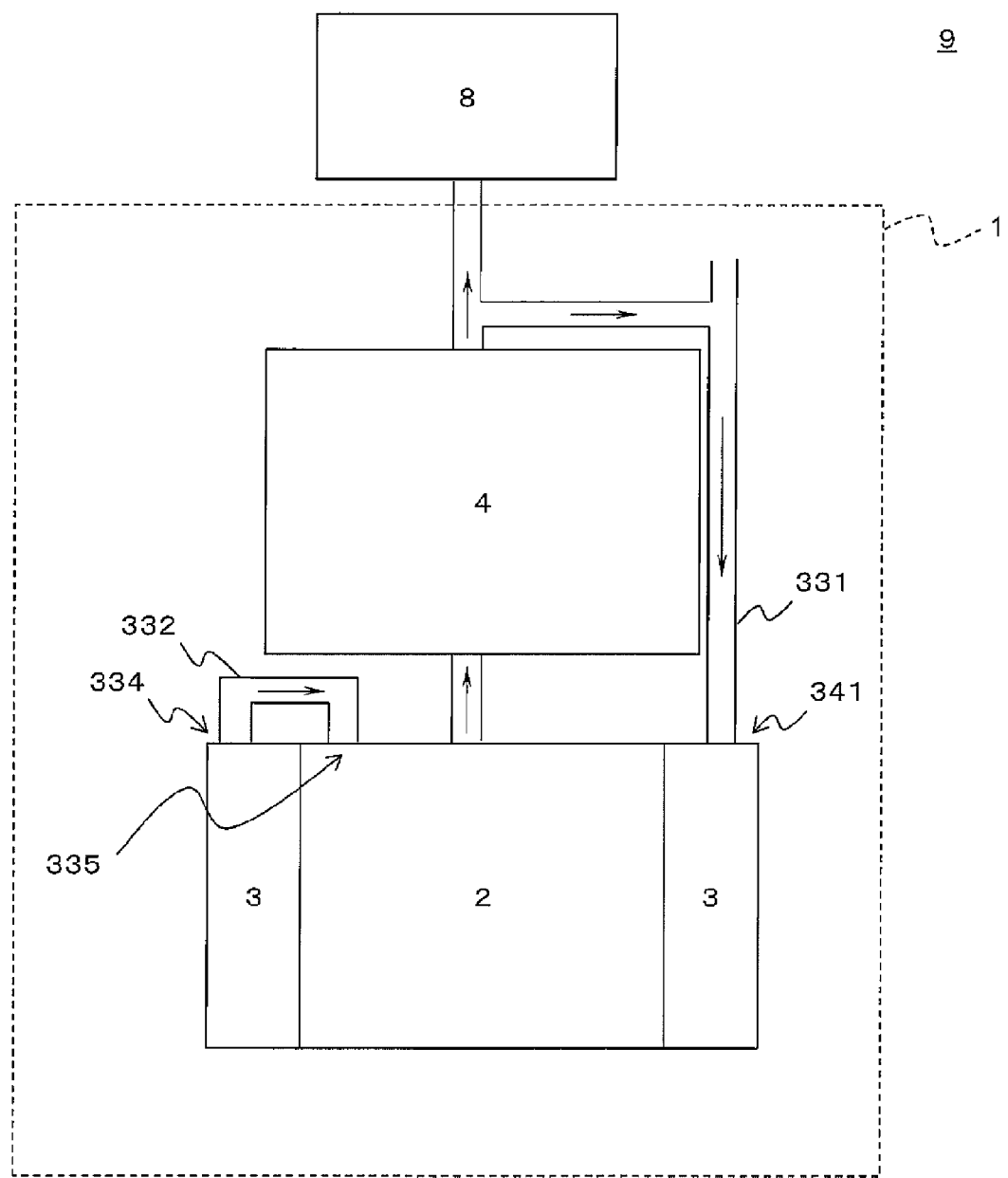
FIG. 7 is a conceptual diagram showing one example of a schematic configuration of a fuel cell system of Embodiment 3.
Figure 8:
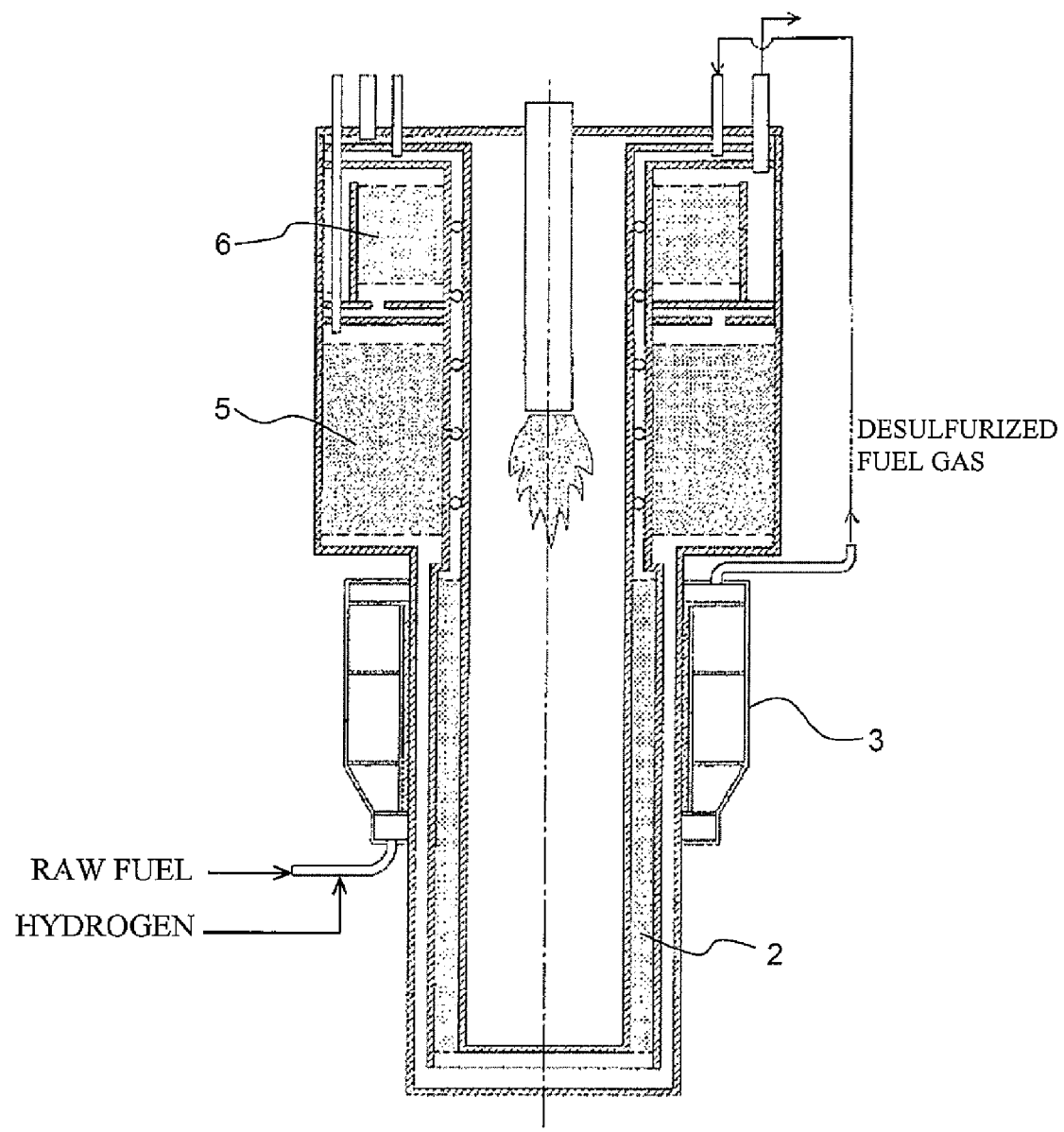
FIG. 8 is a cross-sectional view showing a schematic configuration of a hydrogen generator of PTL 1.

FIG. 7 is a cross-sectional view showing one example of a schematic configuration of the fuel cell system according to Embodiment 3.

In the example shown in FIG. 7, a fuel cell system 9 of the present embodiment includes the hydrogen generator 1 of Embodiment 1 and a fuel cell 8.

The fuel cell 8 is a fuel cell configured to generate electric power using the hydrogen-containing gas supplied from the hydrogen generator 1. The fuel cell 8 may be any type of fuel cell. Examples of the fuel cell 8 include a polymer electrolyte fuel cell (PEFC), a solid-oxide fuel cell, and a phosphoric acid fuel cell.

At the time of the electric power generating operation, the fuel cell system 9 generates electric power using the hydrogen-containing gas supplied from the hydrogen generator 1. In a case where the fuel cell 8 is regarded as the hydrogen utilizing device in Embodiment 1, the operations of the hydrogen generator 1 in the present embodiment are the same as those of Embodiment 1. Therefore, detailed explanations thereof are omitted.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention.

INDUSTRIAL APPLICABILITY

One aspect of the present invention is useful as a hydrogen generator including a hydro-desulfurizer, and a fuel cell system, each of which improves the use efficiency of the hydrogenation catalyst more than before.

REFERENCE SIGNS LIST 1 hydrogen generator
2 reformer
3 hydro-desulfurizer
4 CO reducer
5 shift converter
6 selective oxidizer
7 heat insulating member
8 fuel cell
9 fuel cell system
10 hydrogen generator
301 outer tube
302 inner tube
303 upper surface plate
304 lower surface plate
306 dividing member
307 dividing member
310 hydrodesulfurization catalyst
321 upper header
322 lower header
331 material gas supply passage
332 material gas discharge passage
341 material gas inlet port
342 material gas outlet port
343 material gas inlet port

The invention claimed is:

1. A hydrogen generator comprising:
   a tubular reformer configured to generate a hydrogen-containing gas by a reforming reaction using a material gas;
   a CO reducer configured to reduce carbon monoxide contained in the hydrogen-containing gas generated in the reformer;
   a tubular hydro-desulfurizer provided at an outer periphery of the reformer and configured to remove a sulfur compound contained in the material gas; and
   a material gas supply passage through which the material gas and the hydrogen-containing gas to be supplied to the hydro-desulfurizer flows, wherein an output of the reformer is fluidly coupled to the material gas supply passage, wherein:
   the material gas supply passage is configured to perform heat exchange with the CO reducer;
   the hydro-desulfurizer has one end surface and another end surface; and
   a material gas inlet port of the hydro-desulfurizer is provided at the one end surface closer to the CO reducer than the another end surface.

2. The hydrogen generator according to claim 1, wherein:
   the reformer has one end surface and another end surface;
   a material gas inlet port of the reformer is provided at the one end surface of the reformer closer to the CO reducer than the another end surface of the reformer; and
   a material gas outlet port of the hydro-desulfurizer is provided at the one end surface of the tubular hydro-desulfurizer closer to the CO reducer than the another end surface of the tubular hydro-desulfurizer.

3. The hydrogen generator according to claim 1, wherein at least a part of the one end surface at which the material gas inlet port of the hydro-desulfurizer is provided includes a portion not overlapping the CO reducer when viewed from an axis direction of the hydro-desulfurizer.

4. The hydrogen generator according to claim 3, wherein the material gas inlet port of the hydro-desulfurizer is provided at the portion not overlapping the CO reducer.

5. The hydrogen generator according to claim 4, wherein a material gas outlet port of the hydro-desulfurizer is provided at the portion not overlapping the CO reducer.

6. The hydrogen generator according to claim 3, wherein:
   the CO reducer has a tubular shape; and
   an outer diameter of the hydro-desulfurizer is larger than that of the CO reducer.

7. The hydrogen generator according to claim 1, wherein:
   the hydro-desulfurizer is provided under the CO reducer in a vertical direction;
   the hydro-desulfurizer includes therein a hydrodesulfurization catalyst and a passage penetrating the hydrodesulfurization catalyst, the passage including a lower end having an opening that is open in the hydro-desulfurizer; and
   an upper end of the passage is connected to any one of the material gas inlet port of the hydro-desulfurizer and a material gas outlet port of the hydro-desulfurizer.

8. A fuel cell system comprising:
   the hydrogen generator according to claim 1; and
   a fuel cell configured to generate electric power using the hydrogen-containing gas supplied from the hydrogen generator.

9. The hydrogen generator according to claim 1, wherein the hydro-desulfurizer overlaps the reformer in a direction perpendicular to an axis direction of the hydro-desulfurizer.

* * * * *